United States Patent
Degen et al.

(10) Patent No.: US 7,297,087 B2
(45) Date of Patent: Nov. 20, 2007

(54) MICRO GEAR SYSTEM OPERATING ACCORDING TO THE STRAIN WAVE GEAR PRINCIPLE WITH HOLLOW SHAFTS

(75) Inventors: Reinhard Degen, Mainz (DE); Rolf Slatter, Limburg-Lindenholzhausen (DE)

(73) Assignee: Micromotion GmbH, Mainz-Gonsenheim (DE)

(*) Notice: Subject to any disclaimer, the term of this patent is extended or adjusted under 35 U.S.C. 154(b) by 67 days.

(21) Appl. No.: 10/497,175

(22) PCT Filed: Dec. 10, 2002

(86) PCT No.: PCT/EP02/13986

§ 371 (c)(1), (2), (4) Date: Jun. 10, 2004

(87) PCT Pub. No.: WO03/052293

PCT Pub. Date: Jun. 26, 2003

(65) Prior Publication Data

US 2005/0014594 A1    Jan. 20, 2005

(30) Foreign Application Priority Data

Dec. 14, 2001 (DE) ................. 101 61 493

(51) Int. Cl.
*F16H 57/08* (2006.01)
(52) U.S. Cl. .............. 475/347; 475/346; 475/345; 475/334; 475/331; 475/177; 184/7.1; 74/640; 384/275

(58) Field of Classification Search ............. 475/331, 475/334, 344, 345, 346, 347, 177; 74/640; 384/275, 276, 277, 278, 296; 184/7.1
See application file for complete search history.

(56) References Cited

U.S. PATENT DOCUMENTS 1,943,929 A * 1/1934 Rayburn ............ 60/399

(Continued)

FOREIGN PATENT DOCUMENTS

DE      3815118 A1      11/1989

(Continued)

OTHER PUBLICATIONS

Bearing Manual Cyclopedia, 1981, Industrial Information Headquarters, Inc., 19th Edition, vol. 2, pp. 959 and 1005.*

(Continued)

*Primary Examiner*—David D. Le
(74) *Attorney, Agent, or Firm*—Charles P. Boukus, Jr.

(57) ABSTRACT

A micro gear system, operating according to the principle of a strain wave gear system, a Wolfrom gear system, or a similar planetary gear system comprises at least one sun wheel (14) and at least two planet wheels (16) meshing with the sun wheel (14). The sun wheel (14) is rotatably fixed to drive shaft (20) placed along a longitudinal axis (18) of the gear system. The planet wheels (16) indirectly or directly mesh with a toothing which is rotatably fixed to a drive shaft (28) placed centrally along the longitudinal axis of the gear system. The drive shafts (20,28) are embodied as hollow shafts (30,32) having continuous bore holes (34,36) such that information or fluid media can be directed through the gear system. A sealing system (42) comprising a labyrinth seal (44) which includes a plurality of annular grooves (46) is disposed between the hollow shafts (30,32).

27 Claims, 3 Drawing Sheets

U.S. PATENT DOCUMENTS

| | | | | |
|---|---|---|---|---|
| 3,668,946 | A | * | 6/1972 | Fahey et al. .................. 74/640 |
| 5,011,387 | A | * | 4/1991 | Speiser ........................ 418/94 |
| 5,260,175 | A | * | 11/1993 | Kowanz et al. ............. 430/326 |
| 5,385,514 | A | * | 1/1995 | Dawe ......................... 475/336 |
| 5,601,370 | A | * | 2/1997 | Shibayama et al. ......... 384/215 |
| 6,841,306 | B2 | * | 1/2005 | Boehme et al. ................. 430/3 |
| 2001/0052735 | A1 | | 12/2001 | Sakamoto ................. 310/75 R |
| 2002/0117342 | A1 | * | 8/2002 | Schoenfelder et al. ...... 180/182 |
| 2003/0121363 | A1 | | 7/2003 | Poehlau |
| 2005/0103635 | A1 | * | 5/2005 | Arai et al. .................... 205/74 |

FOREIGN PATENT DOCUMENTS

| | | |
|---|---|---|
| DE | 19714528 A1 | 9/1997 |
| DE | 10120419 A1 | 3/2002 |
| EP | 627575 A1 * | 12/1994 |
| JP | 63-270946 | 11/1988 |
| JP | 2001-289394 A | 10/2001 |
| JP | 2001-304382 A | 10/2001 |
| JP | 2002-221259 A | 8/2002 |
| WO | WO 01/90603 A1 | 11/2001 |

OTHER PUBLICATIONS

Yasunori Saotome and Akihisa Inoue, New Amorphous Alloys as Micromaterials and the Processing Technologies, Jan. 23-27, 2000, IEEE, pp. 288-293.*

R. Degen, W. Ehrfeld, F. Michel, "Pancake Shaped Micro Gear System With High Transmission Ratio", Proceedings Of Actuator, Jun. 19-21, 2000, pp. 185-188.

R. Degen, "Micro Harmonic Drive: innovative Antriebstechnik miniaturisiert mit LIGA", Proceedings Of Innovative Klein Und Mikroantriabe, May 15-16, 2001, pp. 89-94.

W. Ehrfeld and H. Lehr, "Deep X-Ray Lithography For The Production Of Three-Dimensional Microstructures From Metals, Polymers and Ceramics", Radiat. Phys. Chem., vol. 45, No. 3, pp. 349-365, 1995.

English translation of Japanese Patent Application No. 2001-304382A.

Darle W. Dudley, Handbook Of Practical Gear Design, pp. 1.2-1.3 (1984).

* cited by examiner

MICRO GEAR SYSTEM OPERATING ACCORDING TO THE STRAIN WAVE GEAR PRINCIPLE WITH HOLLOW SHAFTS

FIELD OF THE INVENTION

The invention relates to a gear system in particular a micro gear system, preferably on the principle of the strain wave gear system or Wolfrom gear system or similar revolving-wheel gear systems of flat construction, which has a planetary gear system, comprising a sun wheel and at least two or more planet wheels meshing with the sun wheel, in which the sun wheel is seated in a manner fixed against relative rotation on a drive shaft disposed centrally with respect to a longitudinal axis of the gear system or is a component of this drive shaft, and the planet wheels mesh indirectly or directly with a gear wheel which is connected in a manner fixed against relative rotation to a driven shaft, which is disposed centrally with respect to the longitudinal axis of the gear system.

BACKGROUND OF THE INVENTION

Such gear systems are already known from the prior art, for instance Proceedings of Actuator 2000, June 19-21, Bremen, "Pancake shaped micro gear system with high transmission ratio" by R. Degen, W. Ehrfeld, and F. Michel; *Das Micro Harmonic Drive der Micromotion GmbH: Ein Präzisionsmikrogetriebe für Positionieraufgaben* [Micromotion GmbH's Micro Harmonic Drive: A Precision Micro Gear for Positioning Tasks] by R. Degen and F. Michel, F&M 109 (2001), No. 6, 48-50; and Proceedings of *Innovative Klein-und Mikroantriebe* [Innovative Miniature and Micro Drive Mechanisms], May 15-16, 2001, Mainz, "Micro Harmonic-Drive: *Innovative Antriebstechnik miniaturisiert mit LIGA*" [Micro Harmonic Drive: Innovative Drive Technology Miniaturized with LIGA], by R. Degen. Examples of such known micro gear systems on the principle of strain wave gear systems, such as Harmonic Drive (registered trademark), are also shown in FIGS. 2*a, b* and FIG. 3 and will be described briefly below with respect to the principle of their mode of operation. It will also be noted that the aforementioned published prior art is expressly incorporated by reference into the disclosure content of the present patent application.

The gear principle of a strain wave gear system 56 is distinguished from other designs, such as stationary spur gear systems and planetary gear systems, by its precise and backlash-free transmission properties. These special properties have long been documented in robotics, machine tool design, measuring instruments, air and space travel, and medical technology by the Harmonic Drive principle. Depending on their embodiment, Harmonic Drive gear systems can be classified as either cup gear systems (FIG. 2*a*) or flat gear systems (FIG. 2*b*). The flat construction of this gear principle offers major advantages, especially with a view to micro drive systems, such as the low number of components required, a compact design, and the level of transmission ratio that is required for micro motors and that can be attained with a single gear stage. The basic elements of the Harmonic Drive gear system of flat construction are composed of the wave generator 12 and the gear wheels known as the flexible spline 22, circular spline 24 and dynamic spline 26. As can be seen from FIG. 3, the wave generator 12 in Harmonic Drive gear systems of flat construction is preferably formed by a planetary gear system, comprising one central sun wheel 14 and two or more planet wheels 16 which mesh with the teeth of the sun wheel 14 and in turn mesh with the internal teeth of the flexible spline 22.

The fundamental principle of a Harmonic Drive gear system is that the wave generator 12 deforms the flexible spline 22 elliptically outward in at least two or more regions. As a result, the flexible spline 22 of the gear system, in the two outward-deformed regions, have tooth engagements simultaneously with the two ring gears, that is, the circular spline 24 and the dynamic spline 26. In the regions of the short semiaxis of the elliptically deformed flexible spline, the flexible spline is not in tooth engagement with the circular spline 24 or the dynamic spline 26.

Upon rotation of the sun wheel 14 of the wave generator 12, the tooth engagement regions of the flexible spline 22 migrate with the angular position of the two planet wheels 16 of the wave generator, as shown in the different angular views in FIG. 3. The relative motion between the flexible spline 22 and the circular spline 24 results from the difference, for instance of two teeth, between the number of teeth of the flexible spline and of the circular spline. Upon one full revolution of the planet wheels 16 of the wave generator, the flexible spline 22 rotates relative to the circular spline 24 by the difference in the number of teeth between these two gear wheels. In the flat construction, the dynamic spline 26 serves as a driven element and has the same number of teeth as the flexible spline 22 and therefore also has the same speed and direction of rotation.

The use of a planetary gear system as the wave generator 12 offers the advantages, with a view to the degree of miniaturization of the micro gear system, that all the gear components can be produced with high precision using the known LIGA method described herein; the effort of assembly is reduced, since the wave generator comprises only three elements; the total transmission ratio of the gear is increased by the planetary gear system, so that by means of such a gear system, in a single stage, the very high speeds of rotation of micro motors can be adapted flexibly to individual requirements; and this variant of the wave generator 12 has very low moment of inertia, making highly dynamic positioning operations possible.

SUMMARY OF THE INVENTION

With gear systems and micro gear systems of this kind as described at the outset, it is the object of the invention to carry information or to feed media through the gear system.

With the gear system having the characteristics recited at the outset as the point of departure, this object is attained essentially in that the drive shaft and driven shaft are each embodied as a hollow shaft with a continuous bore or continuous conduit.

Because of these characteristics according to the invention, it is possible to pass lasers, optical fibers, shafts, supply lines or the like, or to feed media, through the gear system along the central axis of rotation, that is, the longitudinal axis of the gear system. For instance, it is possible to pass a vacuum for grasping tasks or handling purposes centrally through the gear system. It is equally possible for optical sensors to look through the gear system and detect objects on the opposite side of the gear system. In conventional multistage gear systems or micro gear systems this is as a rule not possible, since the central bore would have to extend simultaneously through a plurality of successively connected gear stages, whose gear wheels or parts generally do not have a common central axis of rotation. In the micro gear system of the invention, despite the very high transmission ratio in the range of ca. 100 to 1500, with a single gear stage there is one central axis of rotation for the gear system, so that through the bore of the drive shaft or through a bore of the sun wheel and the bore of the driven shaft, information or media can be passed through the gear system, through the conduit formed by these bores. As a rule, this conduit is concentric with the axis of rotation of the drive shaft and driven shaft.

In a first advantageous feature of the invention, with a free end portion pointing toward the driven shaft, the drive shaft can be inserted into the bore in the driven shaft. Because of this provision, the possibility exists of guiding or supporting the drive shaft in the driven shaft and optionally of providing further provisions, for instance providing sealing in the overlapping region between the drive shaft and the driven shaft.

It also proves to be advantageous that the free end portion of the drive shaft is received by a bush seated in the bore in the driven shaft. By means of a bush, an individual adaptation of the external dimensions of the drive shaft in the region of the free end portion and of the internal dimensions of the driven shaft can be made.

Especially advantageously, a sealing system is disposed between the drive shaft and the driven shaft, so that fluid media can be fed through the hollow shafts. In this respect, because of this provision, it is possible to dispense with such additional provisions as hoses or pipelines, since the driven shaft and drive shaft that rotate relative to one another are already sealed off from one another.

In order maximally to avoid the friction torques, which particularly in micro gear systems are extremely unwanted, it is provided in another advantageous feature of the invention that the sealing system is embodied as a contactless seal, preferably a labyrinth seal, and preferably a plurality of annular grooves, disposed offset with respect to the longitudinal axis of the gear system, are disposed in the outer wall of the drive shaft or the inner wall of the bush or of the driven shaft.

In a further advantageous feature of the invention, it is provided that the drive shaft and/or the driven shaft is supported in a housing of the gear system by means of rotary bearings, in particular preferably pre-loaded radial-groove ball bearings. By this provision as well, the friction torques that occur in the gear system are reduced to a minimum. Also by means of this provision, the precision of concentricity of the drive shaft and driven shaft is assured, so that the micro gear system has a high repeating accuracy, constant instantaneous transmission properties, and a long life expectancy.

In another advantageous refinement the planet wheels are embodied as a ring which has spring elasticity in the radial direction. Because of the use of elastic planet wheels, the tooth flank-backlash is eliminated, and a practically backlash-free gear system is created. Also by this provision, production inaccuracies, wear, and problems caused by soiling can be compensated for.

A structurally simple design of the gear system is also obtained by providing that the housing of the gear system comprises two housing parts, which are preferably embodied annularly, mesh with one another in cuplike fashion, and between them receive the wave generator, sun and planet wheels, and flexible, circular, and dynamic splines.

In another concept of the invention, the gear embodied as a micro gear system has a diameter of less than 10 mm and/or a height of ca. 1 mm and/or a transmission ratio of ca. 100 to ca. 1500 and/or a tooth module of less than 100 µm.

It also proves to be advantageous to produce such a micro gear system of the invention using the LIGA process, as described for instance in Radiat, Phys. und chemistry 45 (1995), No. 3, pages 349-365, W. Ehrfeld, H. Lehr, "Deep X-ray Lithography for the production of three-dimensional Micro Structures from Metals, Polymers and Ceramics". The LIGA process includes the steps of lithography, electroforming and molding.

If the gear system of the invention is embodied as a strain wave gear system, it is attractive for the planet wheels to mesh with the internal teeth of an annular flexible spline.

It also proves advantageous that the flexible spline has external teeth, which mesh with the internal teeth of an annular circular spline and with the internal teeth of an annular dynamic spline.

Advantageously, the circular spline and the dynamic spline are axially offset from the longitudinal axis of the gear system.

In another feature of the invention, the flexible spline and circular spline in particular have a slightly different number of meshing teeth.

The dynamic spline is connected to the driven shaft in a manner fixed against relative rotation.

If the gear system is embodied as a revolving wheel gear system or a planetary gear system with floating bearing of the planet wheels without a carrier for guiding the planet wheels, or for torque pickup, that is, if it can be classified in the category of Wolfrom gear systems, then the planet wheels mesh with internal teeth of a split ring gear. Although it is already possible to use two planet wheels, it is attractive to use three planet wheels, which has the advantage that the sun wheel is supported by the planet wheels in a statically determined way. Also the planet wheels can likewise be embodied as compliant in the radial direction, to compensate for inaccuracies caused by play, wear, and production variations.

Advantageously, the ring gear is split into one ring gear structurally connected to the housing and one driven ring gear, and the two ring gears may be axially offset from the longitudinal axis of the gear system.

Preferably, the ring gear structurally connected to the housing and the driven ring gear have in particular a slightly different number of teeth meshing with the teeth of the planet wheels.

Advantageously, the driven ring gear is connected to the driven shaft, or an integral component of this driven shaft, in a manner fixed against relative rotation.

Finally, it proves advantageous that the planet wheels are supported in a floating fashion.

Further characteristics, advantages, possible applications and embodiments of the present invention will become apparent from the ensuing description of an exemplary embodiment in conjunction with the drawings. All the characteristics described and/or shown in the drawings are the subject of the present invention either by themselves or in arbitrary appropriate combination, regardless of how they are recited in the claims and regardless of the claims dependencies.

DETAILED DESCRIPTION OF THE INVENTION

Figure 1:
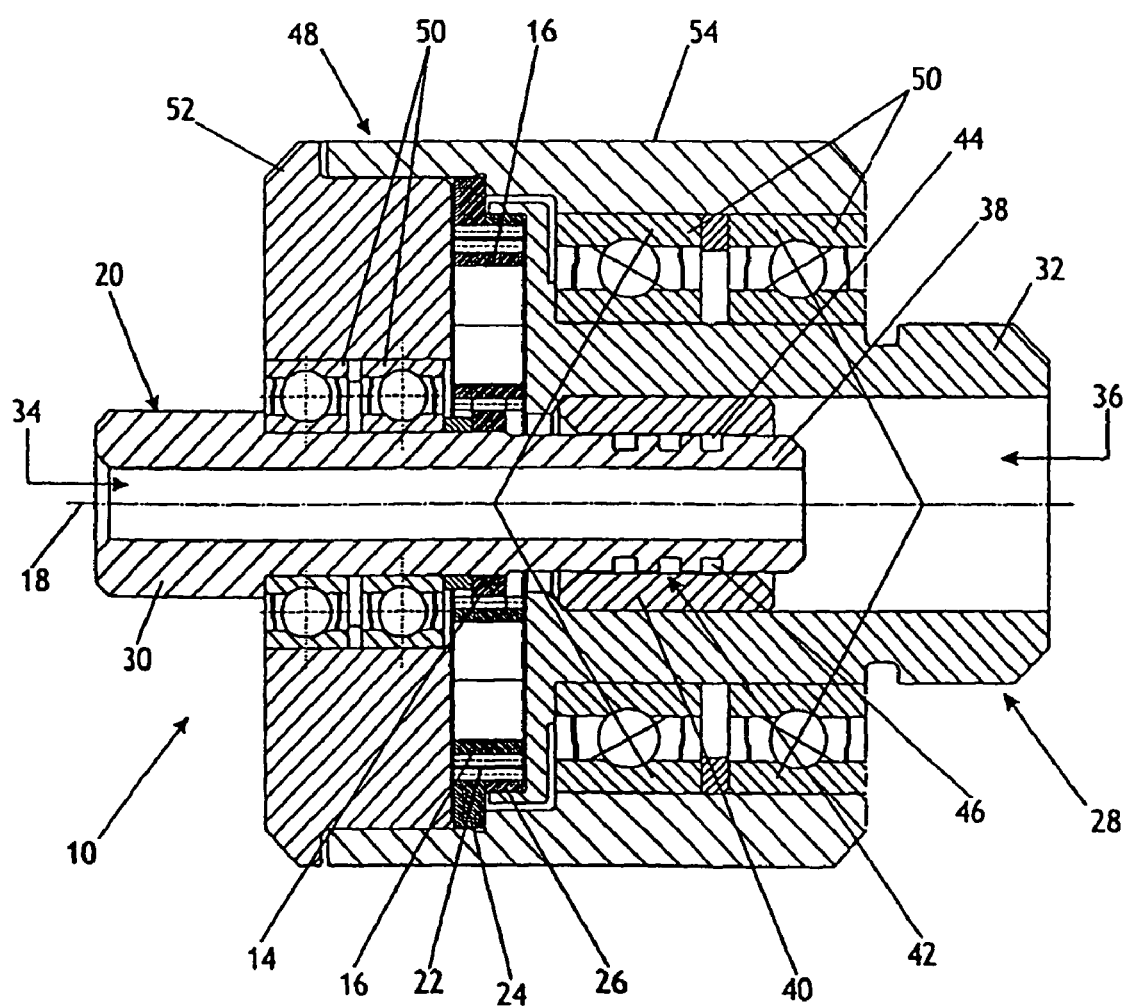
FIG. 1 shows one exemplary embodiment of a micro gear system of the invention in a sectional view.
Figure 2:
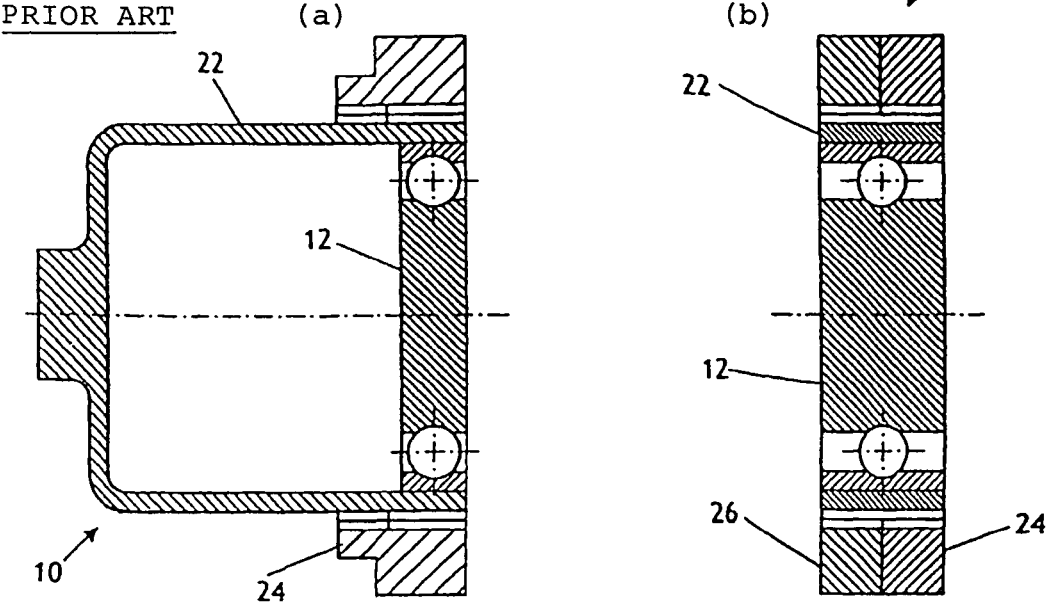
FIG. 2 shows a strain wave gear system of cup-like construction (FIG. 2a) and in flat construction (FIG. 2b), each in a sectional view, in the prior art.
Figure 3:
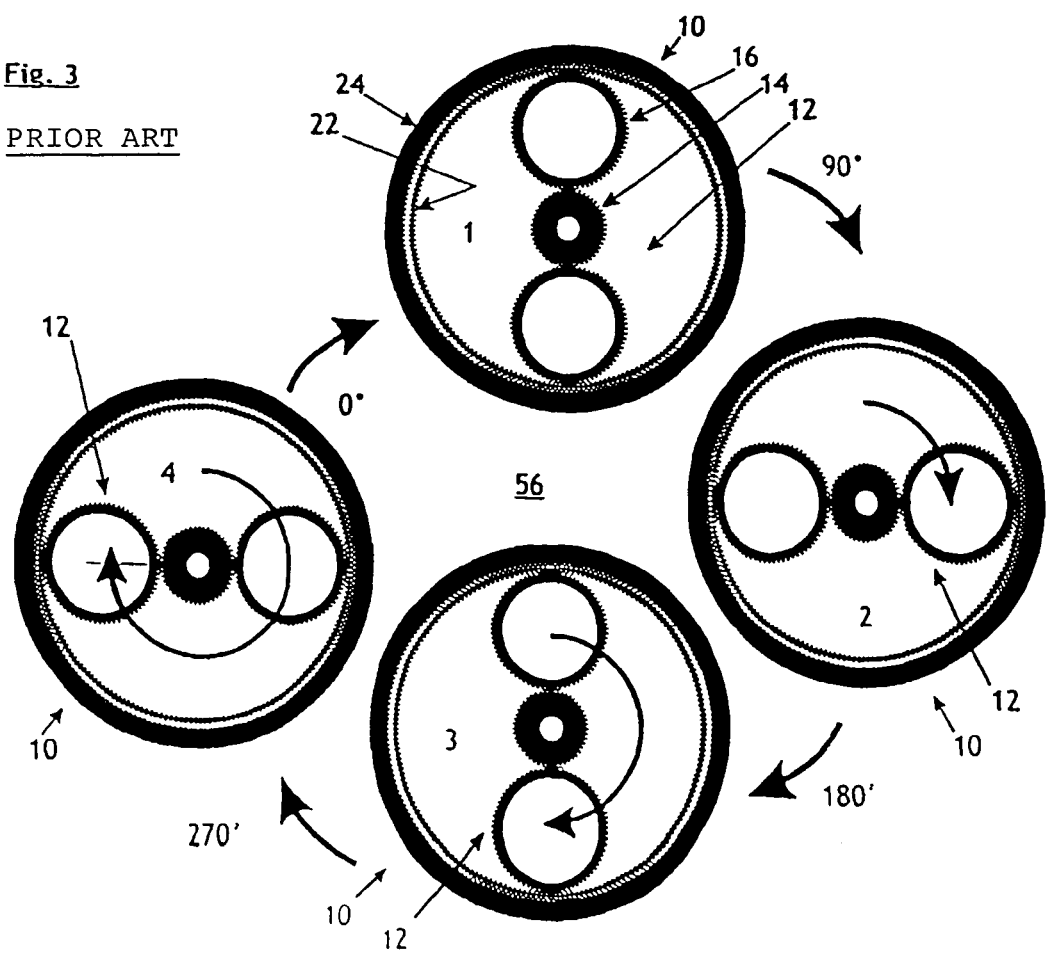
FIG. 3 is a schematic illustration of a Harmonic Drive gear system with a wave generator comprising a sun wheel and two planet wheels, to illustrate the mode of operation.

The fundamental mode of operation of gear systems 10, in particular micro gear systems, on the Harmonic Drive (registered trademark) principle of cup-type or flat construction has already been described in detail at the outset, so that no further description of FIGS. 2 and 3 is needed. Moreover, in the exemplary embodiments of the prior art in FIGS. 2 and 3, for designating identical components in the exemplary embodiment of the present invention shown in FIG. 1, identical reference numerals will be used, so that the gear systems of FIGS. 2 and 3 are self-explanatory, especially in conjunction with the prior art discussed at the outset.

The gear system 10 or micro gear system on the Harmonic Drive principle shown in FIG. 1 is of flat construction and has a wave generator 12, which comprises a planetary gear system, which in turn comprises one sun wheel 14 and at least two planet wheels 16 that mesh with the sun wheel 14. The sun wheel 14 is embodied annularly in the exemplary embodiment of FIG. 1 and is seated in a manner fixed against relative rotation on a drive shaft 20 that is disposed centrally with respect to a longitudinal axis 18 of the gear system.

Naturally, the possibility also exists that the sun wheel 14 is in particular an integral component of this drive shaft 20.

The planet wheels 16 mesh with the internal teeth of an annular flexible spline 22, which in turn has external teeth. The external teeth of the flexible spline 22 mesh both with the internal teeth of an annular circular spline 24 and the internal teeth of an annular dynamic spline 26. The circular spline 24 and the dynamic spline 26 are each annular in shape and are axially offset from one another relative to the longitudinal axis of the gear system. The flexible spline 22 and circular spline 24 have a slightly different number of intermeshing teeth; for instance, the difference in the number of teeth is two, while the dynamic spline 26 has the same number of teeth as the flexible spline 22 and thus serves as a power takeoff element. The dynamic spline 26 is connected to a driven shaft 28 in a manner fixed against relative rotation. In the present exemplary embodiment, as can be seen from FIG. 1, the annular dynamic spline 26 is disposed in a receptacle, widened in cuplike fashion, of the driven shaft 28 and rests with its outer wall on the inner wall of the cuplike receptacle and is joined to the receptacle in a manner fixed against relative rotation, that is, rigidly. It should also be noted that not only the drive shaft 20 but also the driven shaft 28 are disposed essentially centrally with respect to the longitudinal axis 18 of the gear system.

To make it possible for media or information to be passed through this gear system 10, both the drive shaft 20 and driven shaft 28 are each embodied as a hollow shaft 30, 32, with a respective continuous bore 34, 36 or other conduit. Thus for micro gear systems, for the first time, the possibility is made available of transporting media, information or the like through the center of rotation of the gear, so that a laser beam, optical fibers, shafts, supply lines or even media can be carried through the gear system directly on the central axis of rotation. It is thus unnecessary for information, media or the like to be guided around the gear system, which would require major structural expense and a large amount of installation space.

As can also be seen from FIG. 1, the drive shaft 20 protrudes, with a free end portion 38 pointing toward the driven shaft 28, into the bore 36 or conduit in the driven shaft 28. The free end portion 38 of the drive shaft 20, in the exemplary embodiment of FIG. 1, is also received by a bush 40 that is seated in the bore 36 or conduit in the driven shaft 28. Between the drive shaft 20 and the driven shaft 28, a sealing system 42 is provided, which makes it possible, despite the relative motion of the drive shaft 20 and driven shaft 28, to pass a medium directly through the two hollow shafts 30, 32. Although conventional sealing systems, such as rubber seals or the like, in which an elastic sealing face is pressed for sealing purposes between the components that move relative to one another can certainly be used, such conventional seals, especially in view of micro systems, have the disadvantage of creating considerable additional frictional torque in the seal and wearing the sealing faces and thus making the seal gradually leak. In this respect, in the preferred exemplary embodiment of FIG. 1, the sealing system 42 is embodied as a contactless seal, preferably as a labyrinth seal 44, and preferably a plurality of annular grooves 46, offset relative to the longitudinal axis of the gear system, are disposed in the outer wall of the drive shaft 20 or in the inner wall of the bush 40 or driven shaft 28.

The drive shaft 20 and/or driven shaft 28 are supported in a housing 48 of the gear system, by means of rotary bearings 50, in particular preferably pre-loaded radial-groove ball bearings. The planet wheels 16 are also embodied as a ring, which has spring elasticity in the radial direction. The housing 48 of the gear system 10 comprises two housing parts 52, 54, which are preferably embodied annularly, mesh with one another in cuplike fashion, and between them receive the wave generator 12, the sun wheel 14 and planet wheels 16, and the flexible spline 22, circular spline 24, and dynamic spline 26.

The gear system 10 embodied as a micro gear system is distinguished by a diameter of less than 10 mm (preferably about 8 mm), a height of about 1 mm, a transmission ratio of about 100 to about 1500 (preferably about 500 to 1000), and a tooth module of less than 100 (30 to 40) µm, preferably 34 µm, and is preferably produced by the LIGA process including the steps of lithography, electroforming and molding.

The embodiment according to the invention of the drive shaft 20 and the driven shaft 28 each as a hollow shaft 30, 32 with a continuous bore 34, 36 or continuous conduit can also be realized in other revolving wheel gear systems or planetary gear systems with floating planet wheels.

Figure 4:
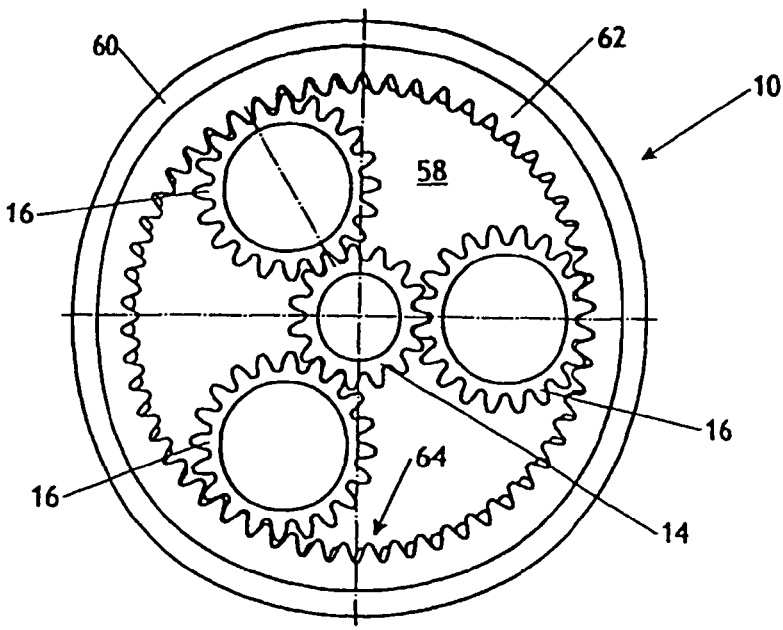
FIG. 4 is a schematic illustration to explain the mode of operation of a planetary gear system with floating bearing of the planet wheels without a carrier, for instance a Wolfrom gear system.
Figure 5:
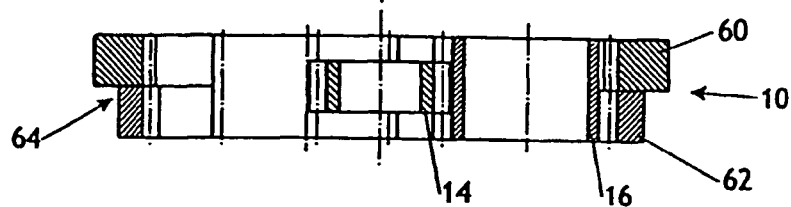
FIG. 5 shows the gear system of FIG. 4 in a sectional view.

In FIGS. 4 and 5, a so-called Wolfrom gear system 58 is shown schematically; in a simple embodiment, it is quite similar to the structure of the strain wave gear system 56 described above. To this extent, identical components are identified by the same reference numerals. Below, only the differences in the structure of the gear system will therefore be addressed.

Figure 6:
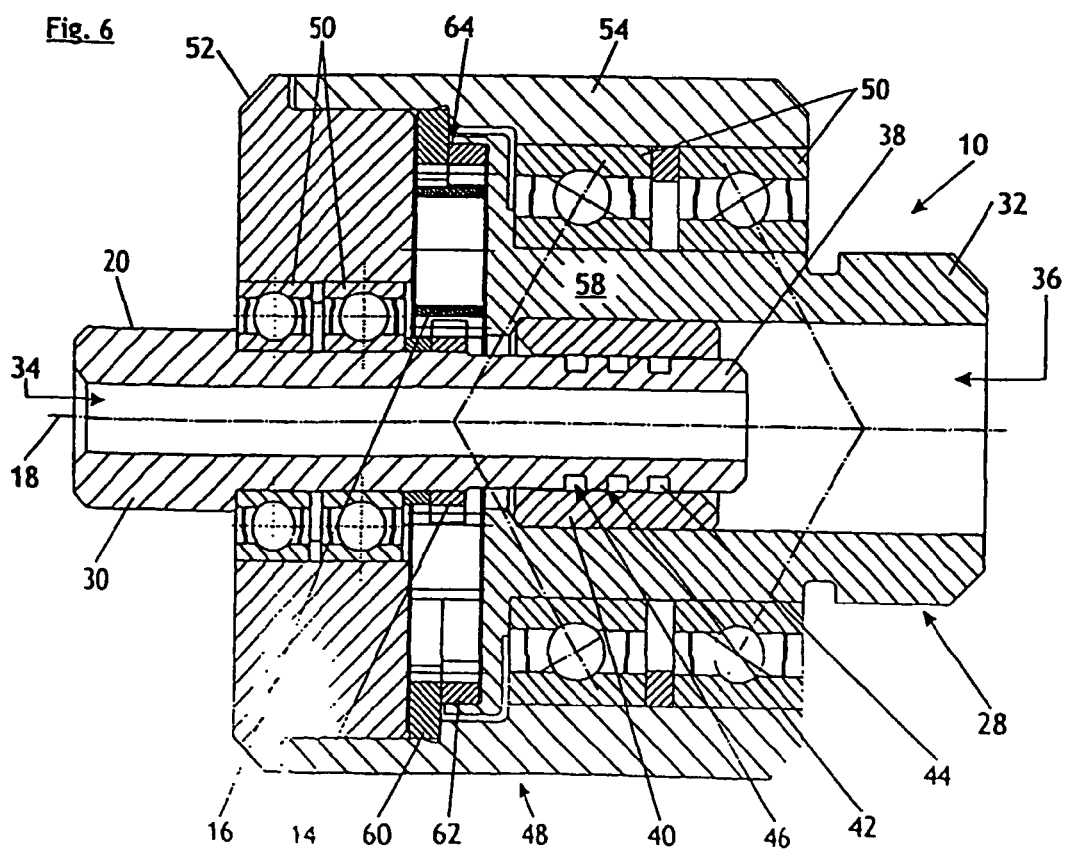
FIG. 6 shows one exemplary embodiment of a Wolfrom gear system of the invention, again in a sectional view.

Essentially, in the Wolfrom gear system of the embodiment of the invention shown in FIG. 6, the flexible spline 22 of the exemplary embodiment of FIG. 1 is omitted. The Wolfrom gear system 58 has a split ring gear 64, which is formed of both a ring gear 60 structurally connected to the housing and a driven ring gear 62, and these ring gears are axially offset from the longitudinal axis 18 of the gear system. The ring gear 60 structurally connected to the housing and the driven ring gear 62 have a slightly different number of teeth that mesh with the teeth of the planet wheels 16. The driven ring gear 62 is connected to the driven shaft 28 in a manner fixed against relative rotation, and the preferably three planet wheels 16 are floatingly supported.

If the sun wheel 14 is set into rotation via a rotational motion of the drive shaft 20, then this motion is transmitted to the preferably three planet wheels 16, whose external teeth mesh with the internal teeth of the sun wheel 14. In the same way, the planet wheels 16, with their external teeth, mesh with the internal teeth of the ring gear 64, or in other words both the ring gear 60 structurally connected to the housing and the driven ring gear 62. To this extent, the driven ring gear 62 is then set, depending on the gear ratios that are to be set individually, into a rotation about the longitudinal axis 18 of the gear system, and this rotation is correspondingly transmitted to the driven ring gear 62 and driven shaft 28 because of the connection of this driven ring gear to this drive shaft in a manner fixed against relative rotation.

In this modified Wolfrom gear system 58 as well, there is a major advantage that both the drive shaft 20 and the driven shaft 28 are embodied as hollow shafts 30, 32 and have a continuous conduit, so that information or fluid media, for instance, can be passed through the gear system 10.

The invention claimed is:

1. A micro gear system on the principle of the strain wave gear system (56) or Wolfrom gear system (58) of flat construction, which has a planetary gear system, comprising a sun wheel (14) and at least two or more planet wheels (16) meshing with the sun wheel (14), in which the sun wheel (14) is seated in a manner fixed against relative rotation on a drive shaft (20) disposed centrally with respect to a longitudinal axis (18) of the gear system or is a component of the drive shaft (20), and the planet wheels (16) mesh indirectly or directly with a gear wheel which is connected in a manner fixed against relative rotation to a driven shaft (28), which is disposed centrally with respect to the longitudinal axis of the gear system, and the planetary gear system has a tooth module of less than 100 µm, and the planet wheels (16) are floatingly supported without a carrier and each planet wheel (16) is embodied as a ring which has spring elasticity in the radial direction, characterized in that the drive shaft (20) and driven shaft (28) are embodied as a hollow shaft (30, 32) and jointly provide a continuous bore (34, 36) or a continuous conduit which passes through a housing (48) of the gear system, the housing (48) of the gear system comprises two housing parts (52, 54), which mesh with one another and form the housing in the shape of a cup, and the housing parts (52, 54) receive the sun wheel (14) and the planet wheels (16) therebetween.

2. The micro gear system of claim 1, produced by a process including the steps of lithography, electroforming and molding.

3. The micro gear system of claim 1, characterized in that the rotary bearings (50) are embodied as O-braced radial-groove ball bearings.

4. The micro gear system of claim 1, characterized in that the housing parts (52, 54) are embodied as annularly shaped elements.

5. The micro gear system of claim 1, characterized in that the drive shaft (20) or driven shaft (28) is supported in the housing (48) of the gear system by rotary bearings (50).

6. The micro gear system of claim 1, characterized in that the driven shaft (28) has an inner end including an outwardly extending annular flange which provides a cup-shaped receptacle, the sun wheel (14) is disposed in the receptacle, and the planet wheels (16) are held between the flange and the housing part (52).

7. The micro gear system of claim 1, characterized in that the drive shaft (20) has a free end portion (38) which extends into the bore (36) in the driven shaft (28), and a sealing system (42) is disposed between the free end portion (38) of the drive shaft (20) and the driven shaft (28).

8. The micro gear system of claim 7, characterized in that the free end portion (38) of the drive shaft (20) is received by a bush (40) seated in the bore (36) or conduit in the driven shaft (28).

9. The micro gear system of claim 8, characterized in that the sealing system (42) is embodied as a contactless seal comprising a labyrinth seal (44) including a plurality of empty annular grooves (46), disposed offset with respect to the longitudinal axis (18) of the gear system, and disposed in the outer wall of the drive shaft (20) or the inner wall of the bush (40).

10. The micro gear system of claim 7, characterized in that the sealing system (42) is disposed between an outer wall of the drive shaft (20) and an inner wall of the driven shaft (28).

11. The micro gear system of claim 10, characterized in that the sealing system (42) is embodied as a contactless seal comprising a labyrinth seal (44) including a plurality of empty annular grooves (46), disposed offset with respect to the longitudinal axis (18) of the gear system, and disposed in the outer wall of the drive shaft (20) or the inner wall of the driven shaft (28).

12. The micro gear system of claim 1, characterized by a diameter of less than 10 mm, a height of about 1 mm, a transmission ratio of about 100 to about 1500, and a tooth module of 30 to 40 µm.

13. The micro gear system of claim 9, characterized by a diameter of about 8 mm.

14. The micro gear system of claim 12, characterized by a tooth module of about 34 µm.

15. The micro gear system of claim 1, characterized in that the gear system (10) is embodied as a strain wave gear system (56), and the planet wheels (16) mesh with internal teeth of an annular flexible spline (22).

16. The micro gear system of claim 15, characterized in that the flexible spline (22) has external teeth, which mesh with internal teeth of an annular circular spline (24) and with internal teeth of an annular dynamic spline (26).

17. The micro gear system of claim 16, characterized in that the circular spline (24) and the dynamic spline (26) are axially offset from the longitudinal axis (18) of the gear system.

18. The micro gear system of claim 16, characterized in that the flexible spline (22) and circular spline (24) have a slightly different number of teeth in the meshing teeth.

19. The micro gear system of claim 16, characterized in that the dynamic spline (26) is connected to the driven shaft (28) in a manner fixed against relative rotation.

20. The micro gear system of claim 19, characterized in that the driven shaft (28) has an inner end including an outwardly extending annular flange which provides a cup-shaped receptacle, the annular dynamic spline (26) is disposed in the receptacle, and the planet wheels (16) are held between the flange and the housing part (52).

21. The micro gear system of claim 1, characterized in that the gear system (10) is embodied as a Wolfrom gear system (58) including three planet wheels (16) which mesh with internal teeth of a split ring gear (64).

22. The micro gear system of claim 21, characterized in that the ring gear (64) has one ring gear (16) structurally connected to the housing and one driven ring gear (62), which are axially offset from the longitudinal axis (18) of the gear system.

23. The micro gear system of claim 22, characterized in that the ring gear (60) structurally connected to the housing and the driven ring gear (62) have a slightly different number of teeth meshing with the teeth of the planet wheels (16).

24. The micro gear system of claim 22, characterized in that the driven ring gear (62) is connected to the driven shaft (28) in a manner fixed against relative rotation.

25. The micro gear system of claim 24, characterized in that the driven shaft (28) has an inner end including an outwardly extending annular flange which provides a cup-shaped receptacle, the driven ring gear (62) is disposed in the receptacle, and the planet wheels (16) are held between the flange and the housing part (52).

26. The micro gear system of claim 1, characterized in that a portion of the drive shaft (20) or the driven shaft (28) extends into the other of said shafts (20) and the driven shaft (28) for sealing the hollow shafts (30, 32) against each other to allow media to pass through the continuous bore (34, 36) without leakage.

27. The micro gear system of claim 26, characterized in that the sealing system (42) is embodied as a contactless seal comprising a labyrinth seal (44) including a plurality of empty annular grooves (46), disposed offset with respect to the longitudinal axis (18) of the gear system.

* * * * *